(12) United States Patent
Nania

(10) Patent No.: US 9,902,242 B1
(45) Date of Patent: Feb. 27, 2018

(54) MOON ROOF ASSEMBLY WITH INTEGRAL HYBRID SOLAR TRIM PANEL

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/350,965

(22) Filed: Nov. 14, 2016

(51) Int. Cl.
*B60J 7/04* (2006.01)
*H02S 20/00* (2014.01)
*H02S 40/42* (2014.01)

(52) U.S. Cl.
CPC ............. *B60J 7/04* (2013.01); *H02S 20/00* (2013.01); *H02S 40/425* (2014.12)

(58) Field of Classification Search
CPC .............................. H02S 20/00; H02S 40/425
USPC ............................................. 206/216.08, 211
See application file for complete search history.

(56) References Cited

U.S. PATENT DOCUMENTS

| | | | |
|---|---|---|---|
| 5,011,544 A | * | 4/1991 | Gaddy ................. H01L 31/042 136/244 |
| 5,213,626 A | | 5/1993 | Paetz |
| 6,406,090 B1 | | 6/2002 | Tolinski et al. |
| 6,423,894 B1 | | 7/2002 | Patz et al. |
| 7,063,379 B2 | | 6/2006 | Steuer et al. |
| 7,445,275 B2 | | 11/2008 | Woodhouse et al. |
| 8,952,236 B2 | | 2/2015 | Song et al. |
| 2002/0053816 A1 | * | 5/2002 | Teschner ................... B60J 7/00 296/211 |
| 2011/0226312 A1 | | 9/2011 | Bohm et al. |
| 2016/0126886 A1 | | 5/2016 | Eo et al. |

FOREIGN PATENT DOCUMENTS

DE          3713854       * 10/1987

* cited by examiner

*Primary Examiner* — Dennis H Pedder
(74) *Attorney, Agent, or Firm* — Jason Rogers; King & Schickli, PLLC

(57) ABSTRACT

A moon roof assembly includes a moon roof housing, a sliding moon roof panel and a hybrid solar trim panel. The hybrid solar trim panel is carried on the moon roof housing and extends at least partially around the sliding moon roof panel.

16 Claims, 4 Drawing Sheets

MOON ROOF ASSEMBLY WITH INTEGRAL HYBRID SOLAR TRIM PANEL

TECHNICAL FIELD

This document relates generally to the motor vehicle equipment field and, more particularly, to a moon roof assembly for a motor vehicle that incorporates a hybrid solar trim panel.

BACKGROUND

Motor vehicles equipped with moon roofs that occupy the entire roof of the vehicle for a superior all-glass or monocolor look are becoming increasingly popular. Significantly, these expansive moon roof designs make it difficult to also equip the motor vehicle with a solar cell array. Placing the solar cell array on the fixed portion of a two-glass panel moon roof system will block the daylight opening above the rear occupants of the motor vehicle and close in the interior cabin feel of openness. Even if semi-transparent cells are used and the solar efficiency is compromised, the daylight opening will be partially blocked. If the solar cell array is placed on the moving glass panel, the daylight opening is also compromised for the front occupants like the rear and a potential issue/complexity of keeping an electrical connection active with the moving glass panel is added.

This document relates to a new and improved moon roof assembly that incorporates a sliding moon roof panel and an integral hybrid solar trim panel carried on the moon roof housing and extending at least partially around the sliding moon roof panel. As a consequence, daylight and vision are unobstructed through the moon roof whether the moon roof is opened or closed. The daylight opening is not blocked in any way by the solar cell array. Further, the integral hybrid solar trim panel is easy to install or replace and provides an aesthetically pleasing appearance as a border around the moon roof panel or panels.

SUMMARY

In accordance with the purposes and benefits described herein, a moon roof assembly is provided. That moon roof assembly comprises a moon roof housing, a sliding moon roof panel and a hybrid solar trim panel. The hybrid solar trim panel is carried on the moon roof housing and extends at least partially around the sliding moon roof panel.

The moon roof assembly may further include a fixed moon roof panel carried on the moon roof housing. In such an embodiment the hybrid solar trim panel may extend along a front edge, a first side edge and a second side edge of the sliding moon roof panel and even along the first side edge and second side edge of the fixed moon roof panel.

The hybrid solar trim panel may include a solar cell array. That solar cell array may be laminated within a protective film. In addition, the solar cell array may also be laminated with an electrical discharge protection film.

The protective film may be selected from a group of protective films consisting of a polyurethane resin film, an ethylene vinyl acetate film and combinations thereof.

The electrical discharge protection film may be a polyvinyl fluoride film.

The hybrid solar trim panel may include a solar cell support and an air passageway between the hybrid solar trim panel and the moon roof housing in order to manage heat from the solar cell array. At least one vent opening may be provided in the moon roof housing in communication with interior ducting of the motor vehicle onto which the moon roof assembly is incorporated.

The solar cell support may include a plurality of ribs underlying and centered on solar cells of the solar cell array. These add strength and rigidity. The solar cell support may also include a downturned perimeter flange and a corner seal element attached to the down-turned perimeter flange.

In some of the many possible embodiments, at least one clip may be provided for securing the solar cell support to the moon roof housing. In other embodiments of the many possible embodiments, at least one urethane glue bead may be provided for spacing and securing the solar cell support to the moon roof housing and sealing the sides of the air passageway.

In other alternative embodiments of the many possible embodiments of the moon roof assembly, the solar cell support may be a transparent panel overlying the solar cell array. In such an embodiment, the solar cell array may be suspended from the transparent panel between two urethane glue beads engaging the moon roof housing and the transparent panel.

In accordance with an additional aspect, a hybrid solar trim panel is provided. That hybrid solar trim panel comprises a solar cell support, a solar cell array supported on the solar cell support, a mounting element for mounting the solar cell support to a surface and a heat management passageway. That heat management passageway is defined between the solar cell support and the mounting element.

The solar cell support may further include a plurality of ribs underlying and centered on solar cells of the solar cell array. Such ribs provide strength and rigidity to the solar cells. Further, the solar cell support may include a downturned perimeter flange and a corner seal element attached to the downturned perimeter flange. Still further, the solar cell support may be a transparent panel overlying the solar cell array.

In the following description, there are shown and described several preferred embodiments of the moon roof assembly as well as the hybrid solar trim panel incorporated in that moon roof assembly. As it should be realized, the moon roof assembly and hybrid solar trim panel are capable of other, different embodiments and their several details are capable of modification in various, obvious aspects all without departing from the moon roof assembly and hybrid solar trim panel as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the moon roof assembly and hybrid solar trim panel and together with the description serve to explain certain principles thereof.

Reference will now be made in detail to the present preferred embodiments of the moon roof assembly and hybrid solar trim panel, examples of which are illustrated in the accompanying drawing figures.

DETAILED DESCRIPTION

Figure 1:
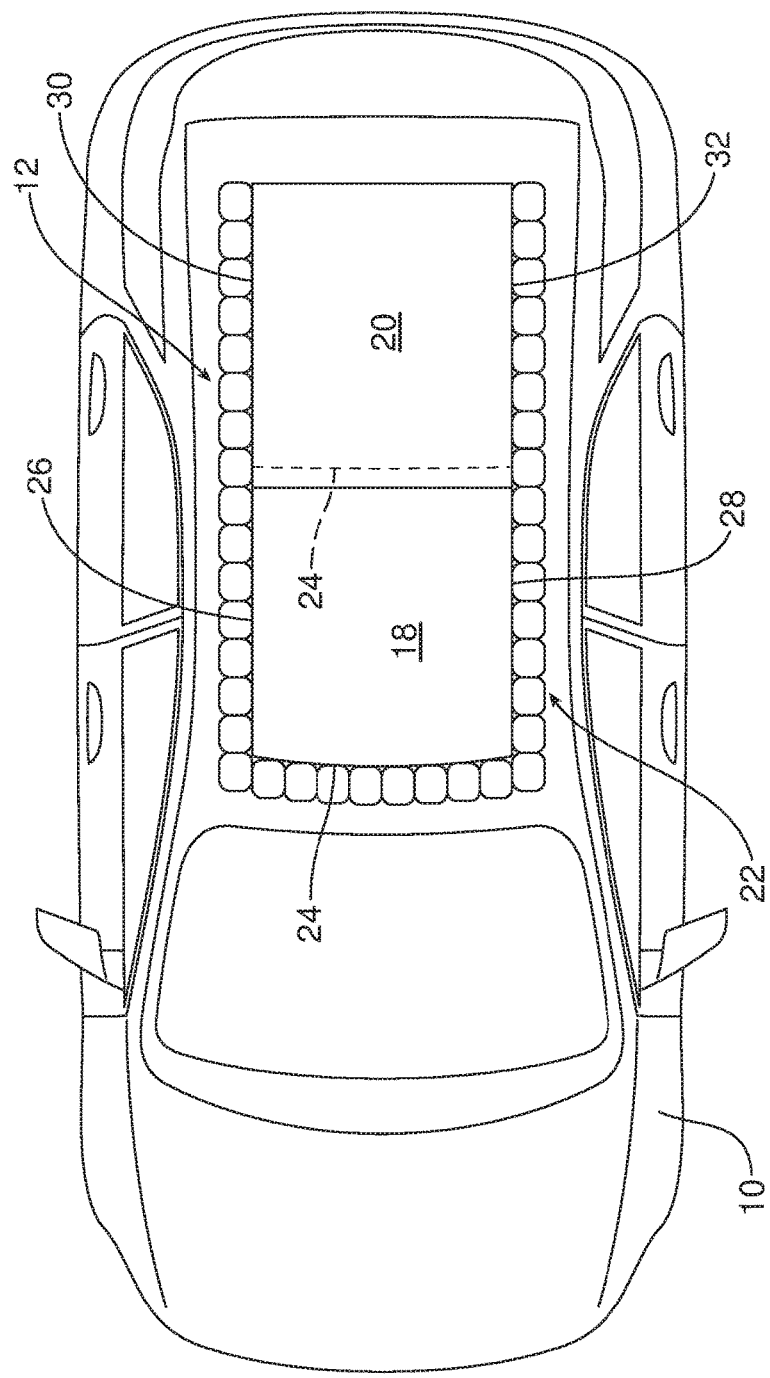
FIG. 1 is a top plan view of a motor vehicle equipped with the moon roof assembly that incorporates an integral hybrid solar trim panel.
Figure 2:
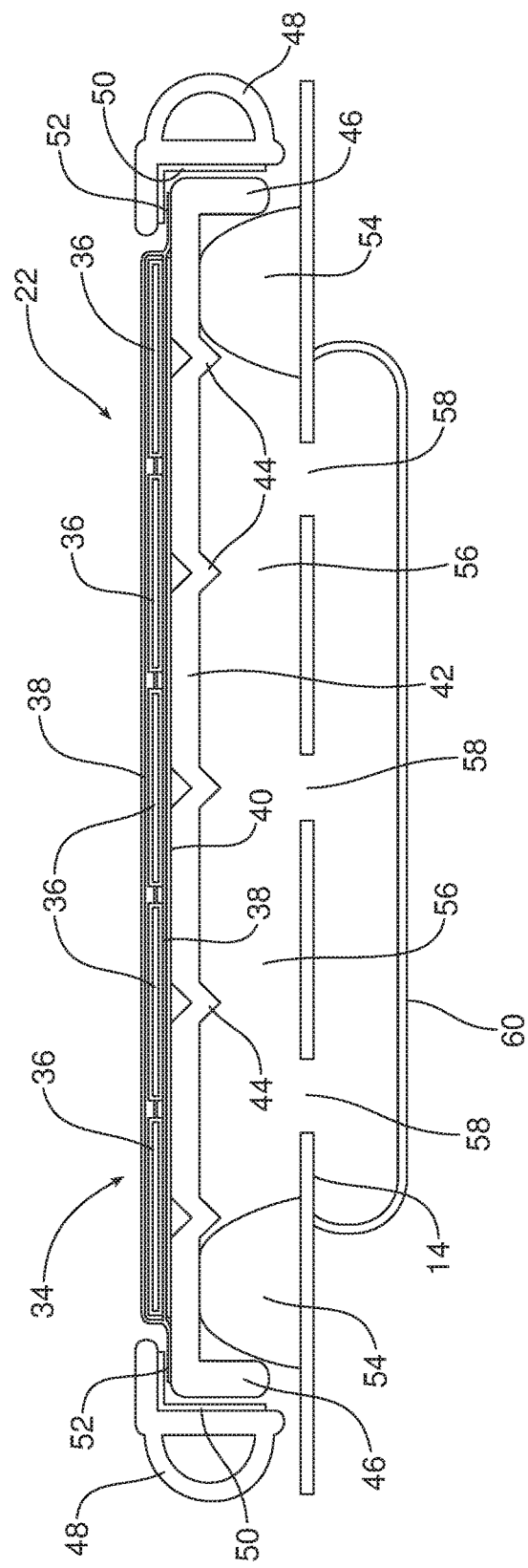
FIG. 2 is a detailed view of a first embodiment of the hybrid solar trim panel.

Reference is now made to FIG. 1 illustrating a motor vehicle 10 equipped with the moon roof assembly 12. As illustrated in FIGS. 1 and 2, the moon roof assembly 12 includes a moon roof housing 14 that is secured to and forms a portion of the roof of the motor vehicle 10.

The moon roof assembly 12 further includes a sliding moon roof panel 18 that is displaceable along a guide track (not shown) between a closed position illustrated in full line and an open position illustrated in phantom line in FIG. 1.

The illustrated embodiment of the moon roof assembly 12 also includes a fixed moon roof panel 20. When closed, the sliding moon roof panel 18 is positioned motor vehicle forward of the fixed moon roof panel 20. When opened, the sliding moon roof panel 18 is displaced rearward so as to overlap or underlap the fixed moon roof panel 20. In the illustrated embodiment, the sliding moon roof panel 18 and the fixed moon roof panel 20 are both void of any solar cells so as to form an expansive moon roof unobstructed by any solar cells or solar cell array.

As further illustrated in FIGS. 1 and 2, the moon roof assembly 12 also includes an integral hybrid solar trim panel generally designated by reference numeral 22. As best illustrated in FIG. 1, the hybrid solar trim panel 22 is carried on the moon roof housing and extends at least partially around the sliding moon roof panel 18. More specifically, in the illustrated embodiment the hybrid solar trim panel 22 extends along a front edge 24, a first side edge 26 and a second side edge 28 of the sliding moon roof panel 18. Further, the hybrid solar trim panel 22 extends along the third side edge 30 and fourth side edge 32 of the fixed moon roof panel 20.

Reference is now made to FIG. 2 illustrating a first embodiment of the hybrid solar trim panel 22. In this embodiment, the hybrid solar trim panel 22 includes a solar cell array 34 made up of a plurality of solar cells 36. The solar cell array 34 is laminated within a protective film 38 which effectively envelopes the solar cells. In addition, the solar cell array 34 is also laminated with an electrical discharge protection film 40.

The protective film 38 is similar in some respects to the polyvinyl butyral (PVB) utilized in the middle layer of safety glass windshields. The protective film 38 works with heat and pressure to bond and seal the solar cells 36 while also protecting from potential hail and rock damage. The protective film 38 is as clear as possible to allow sunlight to pass but also withstands discoloration associated with UV ray effect. The protective film 38 may be made from a protective film material selected from a group consisting of ethylene vinyl acetate, polyurethane resin and combinations thereof. Suitable protective films 38 include, but are not limited to, PUL 2006 protective film and UBF-510 ultra-barrier film from 3M.

The electrical discharge protection film 40 protects against electrical discharge, includes adhesive backing on both sides and works with heat and pressure in the lamination processing. The electrical discharge protection film 40 may be a polyvinyl fluoride composite film such as available from E. I. du Pont de Nemours and Company under the trademark TEDLAR®.

The hybrid solar trim panel 22 illustrated in FIG. 2 also includes a solar cell support 42 which may, for example, be stamped from a single sheet of steel, coated steel, aluminum or other appropriate material. In the illustrated embodiment, the solar cell support 42 includes a plurality of ribs 44 and a downturned perimeter flange 46.

In the illustrated embodiment, the solar cell array 34 rests upon the underlying solar cell support 42 with the ribs 44 of the solar cell support being centered on the solar cells 36 so as to provide added stiffness, optimal support and potential conduction heat dissipation from the solar cells. A corner seal element 48 is attached to the downturned perimeter flange 46 by means of two-sided pressure sensitive tape 50 or other appropriate means.

More specifically, in the illustrated embodiment the sealed edges 52 of the protective film 38 are captured between the corner seal element 48 and the solar cell support 42 by the pressure sensitive tape 50. Further, the electrical discharge protection film 40 is captured between the sealed edges 52 of the protective film 38 and the upper surface of the solar cell support 42.

At least one urethane glue bead 54 is provided between the solar cell support 42 and the moon roof housing 14. An air passageway 56 is defined between the solar cell support 42 and the moon roof housing 14 and sealed at the sides by the urethane glue bead 54. The air passageway 56 may also be known as a heat management passage since it functions to dissipate heat from the solar cells 36 of the solar cell array 34.

As further illustrated in FIG. 2, at least one vent opening 58 is provided in the moon roof housing 14 in order to provide communication between the air passageway 56 and interior ducting 60 of the vehicle air handling system of the motor vehicle. This vehicle air handling system manages air pressure within the motor vehicle cabin and evacuates in-cabin air to the exterior of the motor vehicle. The air may be moved through the duct 60 by fan or vehicle speed inlet/outlet pass through.

Thus, it should be appreciated that heat generated in the solar cells 36 of the solar cell array 34 passes via conduction through the ribs 44 of the solar cell support 42. The solar cell support 42 and, more particularly, the ribs 44 have a relatively large surface area exposed to air in the air passageway 56. Accordingly, the solar cell support 42 and the ribs 44 function as a heat sink and heat from the solar cells 36 of the solar cell array 34 is dissipated in the air in the air passageway 56 and that air circulates through the vent openings 58 to the interior ducting 60 which exhausts that air from the motor vehicle.

Figure 3:
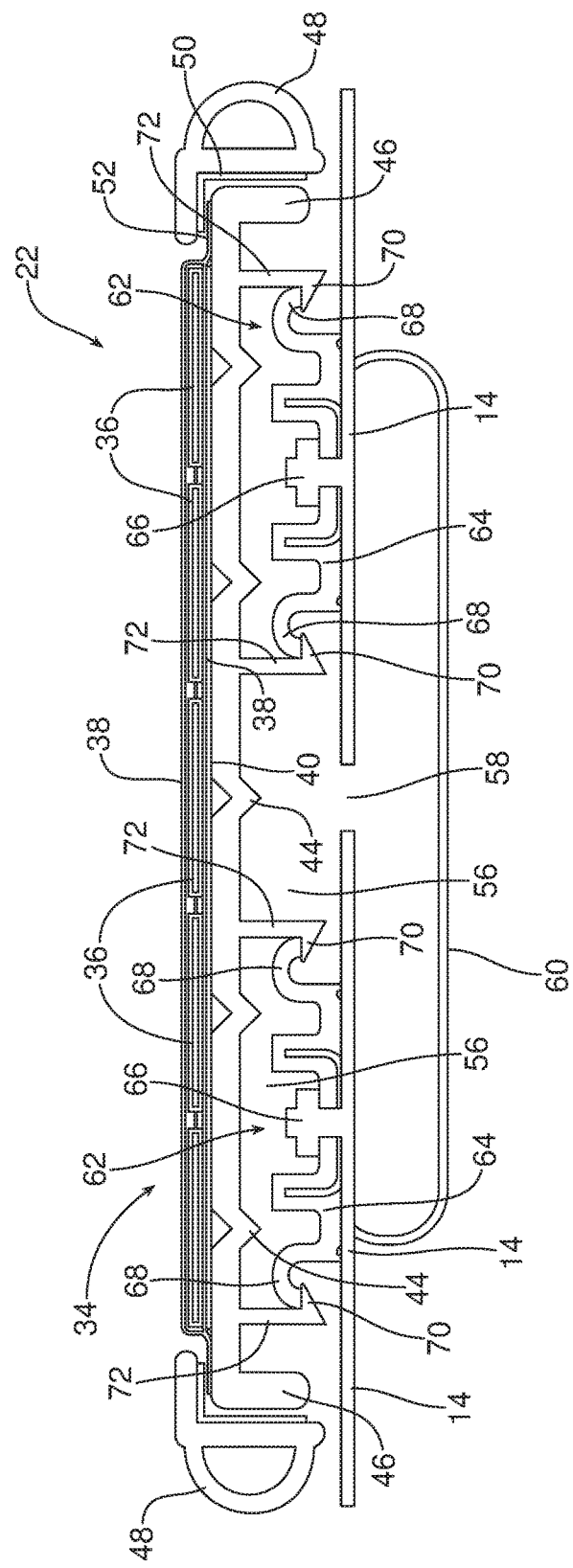
FIG. 3 is a schematic illustration of a second embodiment of a hybrid solar trim panel.

Reference is now made to FIG. 3 which illustrates an alternative embodiment of hybrid solar trim panel 22. For purposes of brevity, structures in the FIG. 3 embodiment identical to structures in the FIG. 2 embodiment are identified by the same reference numbers. The FIG. 3 embodiment differs from the FIG. 2 embodiment by the manner in which the solar cell support 42 is secured to the moon roof housing 14.

More specifically, the urethane glue bead 54 of the FIG. 2 embodiment is eliminated and replaced with a clip mounting system generally designated by reference numeral 62. More specifically, the FIG. 3 embodiment includes resilient clips 64 that are attached to the moon roof housing 14 by means of fasteners 66. The clips 64 include hook ends 68 that engage a tab 70 on the distal ends of resilient legs 72 depending from the underside of the solar cell support 42.

Figure 4:
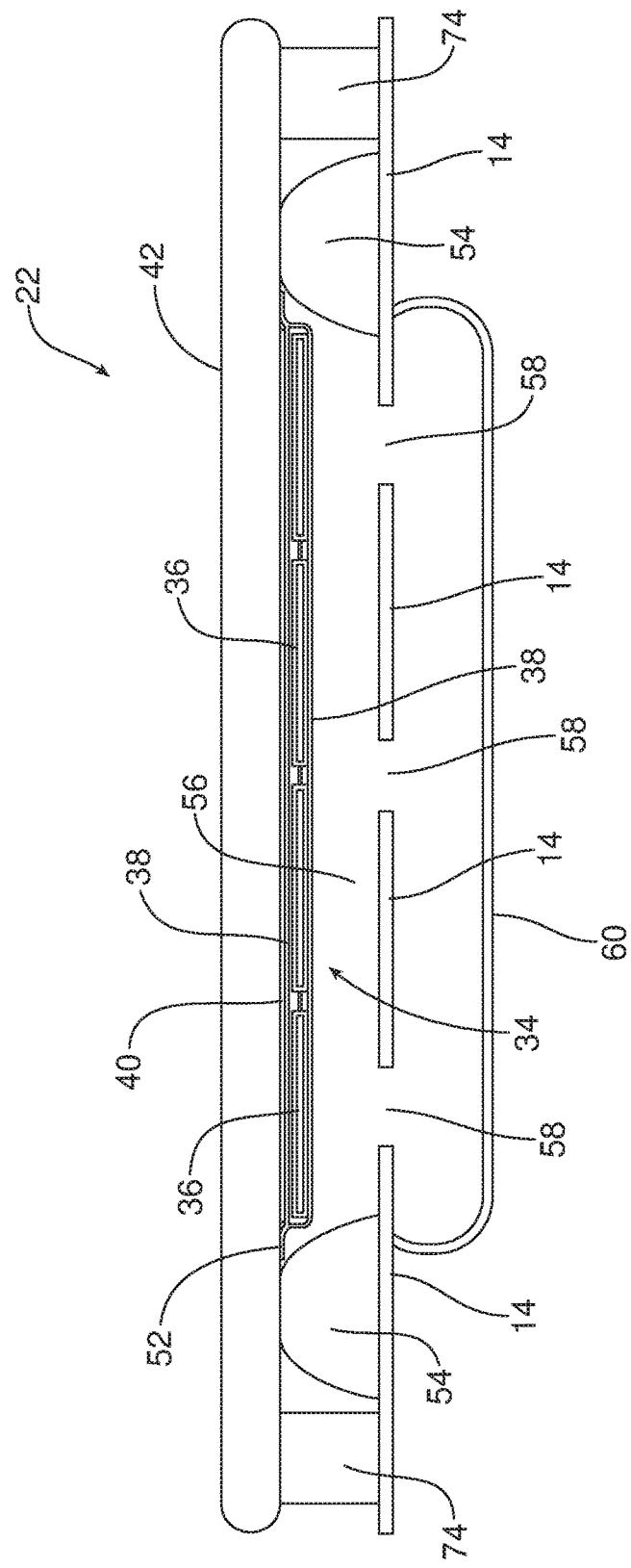
FIG. 4 is a schematic view of a third embodiment of hybrid solar trim panel.

Reference is now made to FIG. 4 illustrating yet another alternative embodiment of the hybrid solar trim panel 22. In this embodiment, the solar cell support 42 comprises a transparent panel which may be made from clear soda lime glass (tempered single sheet) or laminated glass. The transparent panel/solar cell support 42 may be shaped with curvature and sized to fit the roof of the motor vehicle outside of the sliding moon roof panel 18 and fixed moon roof panel 20. Pads 74 at the interior and exterior margins of the transparent panel/solar cell support 42 set the height of the transparent panel/solar cell support while urethane glue beads 54 seal the air passageway 56 defined between the beads, the transparent panel/solar cell support 42 and the underlying moon roof housing 14. As illustrated, the solar cell array 34 is suspended on the underside of the transparent panel/solar cell support 42 between the urethane glue beads 54 in the air passageway 56 so as to provide excellent heat dissipation and heat management.

In summary, the moon roof assembly 12 and the hybrid solar trim panel 22 integrated into that moon roof assembly both provide a number of benefits and advantages. The sliding moon roof panel 18 and fixed moon roof panel 20 provide an expansive daylight opening unencumbered by solar cells so as to provide the free passage of light and an unobstructed view. The hybrid solar trim panel 22 that borders the sliding moon roof panel 18 and fixed moon roof panel 20 is easy to install and replace. The hybrid solar trim panel 22 also provides an excellent aesthetic appearance while being relatively uncomplicated in structure and relatively simple to produce in an efficient and effective manner.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A moon roof assembly, comprising:
   a moon roof housing;
   a sliding moon roof panel; and
   a hybrid solar trim panel carried on said moon roof housing and extending at least partially around said sliding moon roof panel.

2. The moon roof assembly of claim 1, further including a fixed moon roof panel carried on said moon roof housing.

3. The moon roof assembly of claim 2, wherein said hybrid solar trim panel extends along a front edge, a first side edge and a second side edge of said sliding moon roof panel.

4. The moon roof assembly of claim 1, wherein said hybrid solar trim panel includes a solar cell array.

5. The moon roof assembly of claim 4, wherein said solar cell array is laminated within a protective film.

6. The moon roof assembly of claim 5, wherein said solar cell array is also laminated with an electrical discharge protection film.

7. The moon roof assembly of claim 6, wherein said protective film is selected from a group of protective films consisting of a polyurethane resin film, an ethylene vinyl acetate film and combinations thereof.

8. The moon roof assembly of claim 7, wherein said electrical discharge protection film is a polyvinyl fluoride film.

9. The moon roof assembly of claim 8, wherein said hybrid solar trim panel includes a solar cell support and an air passageway between said hybrid solar trim panel and said moon roof housing.

10. The moon roof assembly of claim 9, further including at least one vent opening in said moon roof housing in communication with interior ducting of a motor vehicle.

11. The moon roof assembly of claim 10, wherein said solar cell support includes a plurality of ribs underlying and centered on solar cells of said solar cell array.

12. The moon roof assembly of claim 11, wherein said solar cell support includes a downturned perimeter flange and a corner seal element attached to said downturned perimeter flange.

13. The moon roof assembly of claim 12, further including at least one clip securing said solar cell support to said moon roof housing.

14. The moon roof assembly of claim 12, further including at least one urethane glue bead securing said solar cell support to said moon roof housing.

15. The moon roof assembly of claim 10, wherein said solar cell support is a transparent panel overlying said solar cell array.

16. The moon roof assembly of claim 15, wherein said solar cell array is suspended from said transparent panel between two urethane glue beads engaging said moon roof housing and said transparent panel.

\* \* \* \* \*